US008089667B2

(12) United States Patent
Gugler et al.

(10) Patent No.: US 8,089,667 B2
(45) Date of Patent: Jan. 3, 2012

(54) METHOD FOR DETERMINING PARAMETERS RELEVANT TO THE PRINT QUALITY OF A PRINTED PRODUCT

(75) Inventors: Christian Gugler, Ramstadt (DE); Shahram Hauck, Hanau (DE)

(73) Assignee: manroland AG, Offenbach (DE)

( * ) Notice: Subject to any disclaimer, the term of this patent is extended or adjusted under 35 U.S.C. 154(b) by 1308 days.

(21) Appl. No.: 11/732,554

(22) Filed: Apr. 4, 2007

(65) Prior Publication Data

US 2008/0246979 A1 Oct. 9, 2008

(51) Int. Cl.
*H04N 1/46* (2006.01)

(52) U.S. Cl. ........................................................ 358/504

(58) Field of Classification Search .................. 358/448, 358/504

See application file for complete search history.

(56) References Cited

U.S. PATENT DOCUMENTS

| | | | | |
|---|---|---|---|---|
| 4,200,932 | A * | 4/1980 | Schramm et al. | 101/350.1 |
| 5,372,921 | A * | 12/1994 | Gingello et al. | 430/509 |
| 2005/0105111 | A1* | 5/2005 | Ott et al. | 358/1.9 |
| 2006/0152706 | A1* | 7/2006 | Butland | 356/71 |

* cited by examiner

*Primary Examiner* — Benny Tieu
*Assistant Examiner* — Eric A Rust
(74) *Attorney, Agent, or Firm* — Leydig, Voit & Mayer, Ltd.

(57) ABSTRACT

The invention provides a method for determining parameters relevant to the print quality of a printed product. A macroscopic photogram of a measuring field of the printed product is recorded using a camera having a macro lens. An actual value of a parameter relevant to the print quality is determined from the macroscopic photogram. The actual value is compared to a nominal value of the parameter relevant to the print quality. Whether the measuring field is printed with adequate quality is determined based on the comparison of the actual valve with the nominal value of the parameter relevant to the print quality.

6 Claims, 5 Drawing Sheets

METHOD FOR DETERMINING PARAMETERS RELEVANT TO THE PRINT QUALITY OF A PRINTED PRODUCT

FIELD OF THE INVENTION

The present invention relates to a method for determining parameters relevant to the print quality of a printed product.

BACKGROUND OF THE INVENTION

Presently, measuring devices in the form of densitometers or colorimetric measuring devices are used on printing machines in order to determine parameters relevant to the print quality. These measuring devices are used, in particular, for inspecting the measuring fields of a print control strip of a printed product. Actual values of parameters relevant to the printing process can be determined from the measured values from the densitometer and/or the colorimetric measuring device and compared with predetermined nominal values for quality control purposes. Based on this comparison, the printing machine can be adjusted accordingly, e.g., the ink can be adjusted.

Densitometers as well as colorimetric measuring devices utilize an integral functional image of a measuring field to be inspected in order to determine an actual value of a parameter relevant to the print quality of this measuring field. However, this does not take into account whether the measuring field as such is neatly printed. If the measuring field is not neatly or homogenously printed due to insufficient contact pressure between the plate cylinder and the blanket cylinder or due to a defective or soiled rubber blanket, the densitometer or the colorimetric measuring device does not deliver an exact actual value such that, for example, an ink control system based on such an actual value can lead to inferior printing results.

BRIEF SUMMARY OF THE INVENTION

In view of the foregoing, a general object of the present invention is to develop a novel method for determining the parameters relevant to the print quality of a printed product.

According to the invention, at least one macroscopic photogram of a measuring field is recorded with the aid of a camera that features a macro lens. At least one actual value of at least one parameter relevant to the print quality is determined from the macroscopic photogram or each of the macroscopic photograms recorded with the camera using an image processing method so as to determine if the measuring field is printed with adequate quality.

The present invention involves inspecting measuring fields with the aid of a camera that features a macro lens, particularly a miniature high-resolution camera, and recording corresponding macroscopic photograms during this process. Actual values of parameters relevant to the print quality can be determined from the recorded macroscopic photograms using an image processing method in order to verify that the measuring fields themselves are neatly printed. This method makes it possible to examine full-tone measuring fields as well as halftone measuring fields with respect to a clean print image. The result of this quality check, for example, can be used for deciding if the measured values of a measuring field provided by a densitometer and/or a colorimetric measuring device are suitable for use in ink control.

If the measuring field consists of a full-tone measuring field for a printing ink, an advantageous further aspect of the invention can involve determining an actual value for the full-tone measuring field from a gray scale value diagram of the complementary RGB-channel, namely in the form of a uniformity distribution or a noise of the gray scale value over the measuring field.

If the measuring field consists of a halftone measuring field for a printing ink, another advantageous aspect of the invention can involve determining an actual value for the halftone measuring field in the form of at least one geometric parameter for halftone dots of the halftone measuring field from the macroscopic photogram or a gray scale value diagram of the complementary RGB-channel.

An exemplary embodiment of the invention is described in greater detail below with reference to the figures. However, the present invention is not limited to this exemplary embodiment.

DETAILED DESCRIPTION OF THE INVENTION

Figure 1:
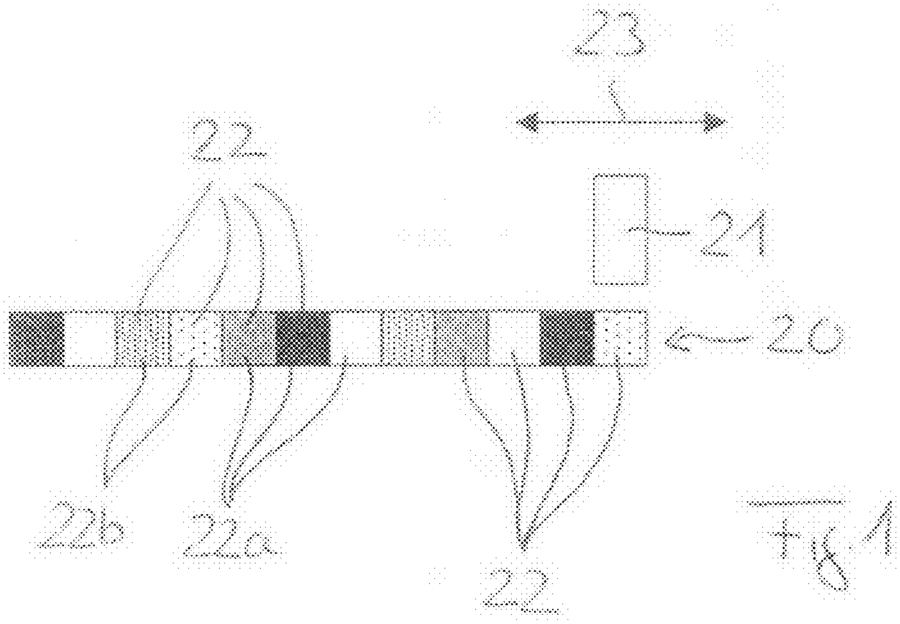
FIG. 1 is a schematic drawing of an exemplary measuring device for carrying out the method of the present invention.
Figure 2:
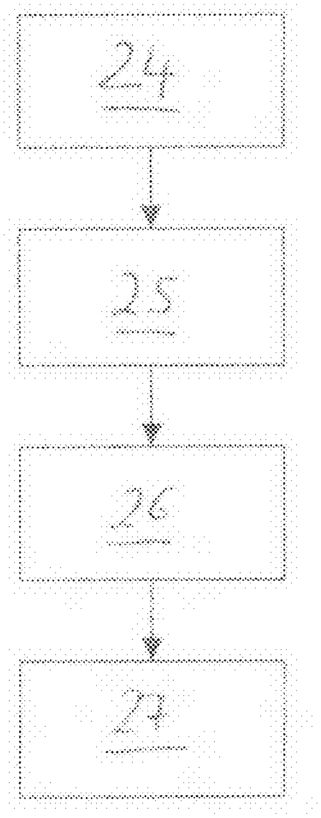
FIG. 2 is a schematic flow chart of an exemplary embodiment of the method of the present invention.

The present invention provides a method for determining parameters relevant to the print quality of a printed product, namely for verifying whether an inspected measuring field of the printed product is printed neatly and with adequate quality. Referring to FIG. 1 of the drawings, inspecting measuring fields of a print control strip 20, namely with the aid of a camera 21 that features a macro lens, is preferred. The camera 21 can consist of a miniature high-resolution camera that records at least one measuring photograph of the measuring fields of the print control strip 20 to be inspected, namely a so-called macroscopic photogram. The term "macroscopic photogram" refers to a measuring photograph that is recorded with the aid of a camera featuring a macro lens a short distance from the measuring field to be inspected. Details of the inspected measuring field are magnified in the corresponding macroscopic photogram similar to a magnifier. The magnification factor of the macro lens of the camera 21 is preferably between 20 and 50.

In FIG. 1, a print control strip 20 with a total of twelve measuring fields 22 is shown. Some measuring fields 22 are in the form of a full-tone measuring fields 22*a* and other measuring fields are in the form of halftone measuring fields 22*b*. The camera 21 featuring the macro lens can be mounted on a crossbeam and can be displaced relative to the print control strip 20 as indicated by the double arrow 23 in order to inspect each measuring field 22 thereof.

The camera 21 can be in the form of a separate component that can be displaced relative to the print control strip 20 independently of other components in order to inspect the measuring fields 22. Alternatively, the camera 21 can be integrated into a measuring head that contains a densitometer and/or a colorimetric measuring device and in which the camera can be displaced relative to the print control strip 20 together with the densitometer and/or the colorimetric measuring device in order to inspect the measuring fields 22.

According to the inventive method for determining the print quality of a measuring field 22 with the aid of a camera 21, at least one macroscopic photogram of the measuring field 22 is recorded in a first step 24. Subsequently, the macroscopic photogram or each macroscopic photogram is evaluated in a step 25 with the aid of an image processing method in order to determine at least one actual value of at least one parameter of the inspected measuring field 22 that is relevant to the print quality. In the next step 26, each determined actual value is compared with a corresponding nominal value in order to verify that the measuring field is printed or printed out with high or adequate quality. If it is determined that the measuring field is not printed out or printed with the required quality, an alarm or error message can be generated at the printing machine in a subsequent step 27 based on the comparison between the actual value and the nominal value carried out in step 26.

The camera 21 can be in the form of a multi-bit camera, particularly an 8-bit camera that inspects a measuring field 22 in the so-called RGB-channels and preferably outputs a macroscopic photogram of the measuring field 22 and a gray scale value diagram of the macroscopic photogram or the measuring field 22 for each RGB-channel. In instances in which an 8-bit camera is used, a total of 256 gray scale values can be illustrated in the gray scale value diagram.

Figure 3:
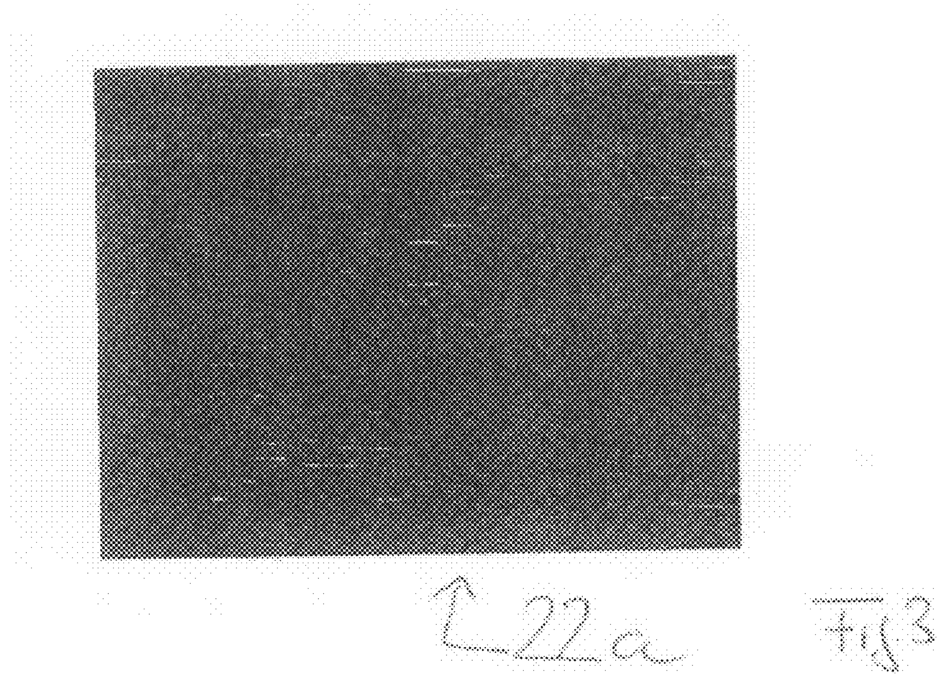
FIG. 3 is an exemplary macroscopic photogram of a full-tone measuring field.
Figure 4:
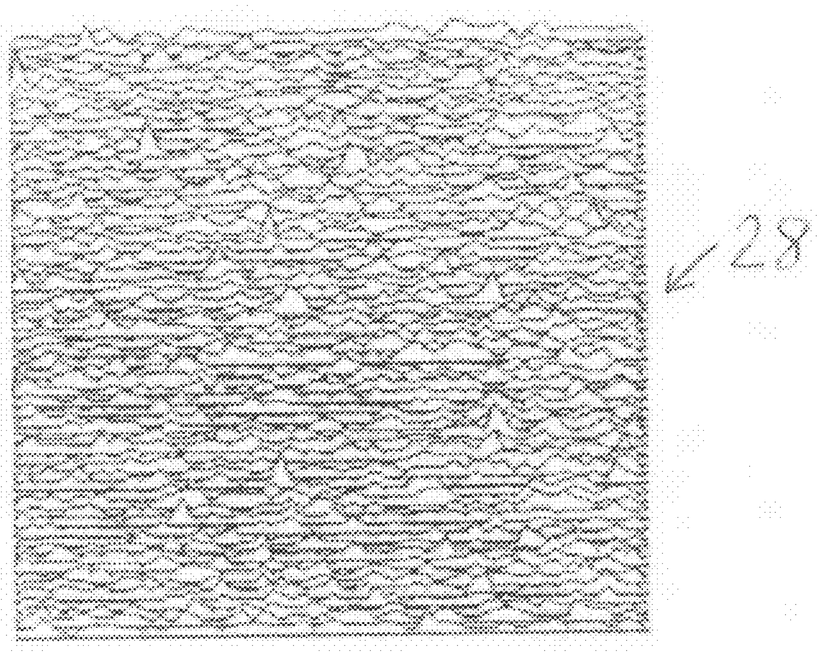
FIG. 4 is an exemplary gray scale value diagram of the full-tone measuring field or macroscopic photogram of FIG. 3.

A macroscopic photogram of a measuring field in the form of the full-tone measuring field 22*a* and printed with a special printing ink is shown in FIG. 3. FIG. 4 is a gray scale value diagram 28 of the macroscopic photogram of FIG. 3 and therefore of the full-tone measuring field 22*a* that is made available by the camera 20 in the complementary RGB-channel relative to the printing ink of the full-tone measuring field 22*a*. The image coordinates of the macroscopic photogram of the full-tone measuring field 22*a* are plotted on the X-coordinate and the Y-coordinate of the gray scale value diagram 28. The gray scale values in the respective pixel of the macroscopic photogram of the full-tone measuring field 22*a* are plotted on the Z-coordinate.

The gray scale value diagram 28 of FIG. 4 comprises a so-called inverted gray scale value diagram, in which a gray scale value of zero corresponds to the maximum color value of the full-tone measuring field 22*a* such that deviations from this maximum color value appear in the form of peaks in the gray scale value diagram 28 of the macroscopic photogram of the full-tone measuring field 22*a*. An actual value for the full-tone measuring field 22*a* in the form of a uniformity distribution of the gray scale values over the image coordinates of the macroscopic photogram of the full-tone measuring field 22*a* or a noise of the gray scale value over the macroscopic photogram or the full-tone measuring field 22*a* can be determined from the gray scale value diagram 28. It can be concluded that a full-tone measuring field 22*a* of adequate print quality is examined if the uniformity distribution or the noise is respectively lower than the corresponding nominal value or limiting value as shown in the embodiment according to FIGS. 3 and 4.

Figure 5:
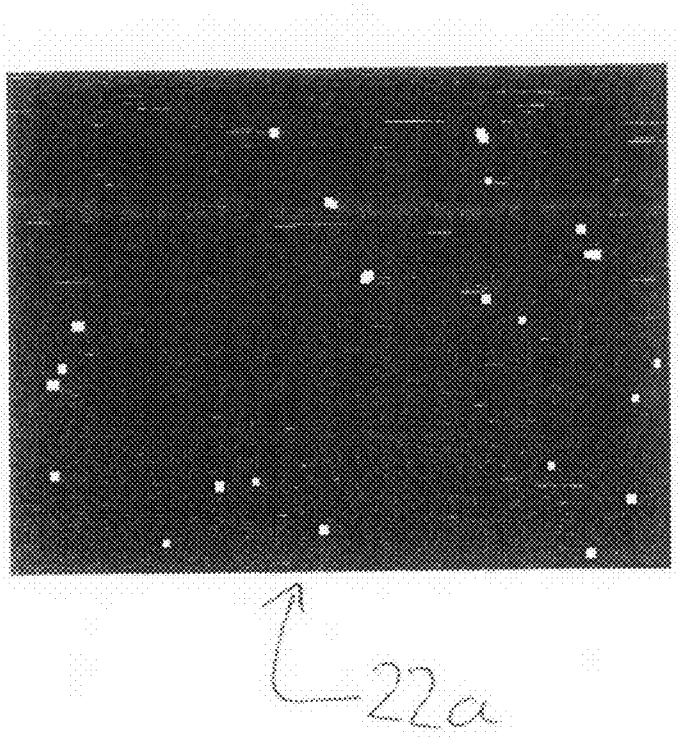
FIG. 5 is another exemplary macroscopic photogram of a full-tone measuring field.
Figure 6:
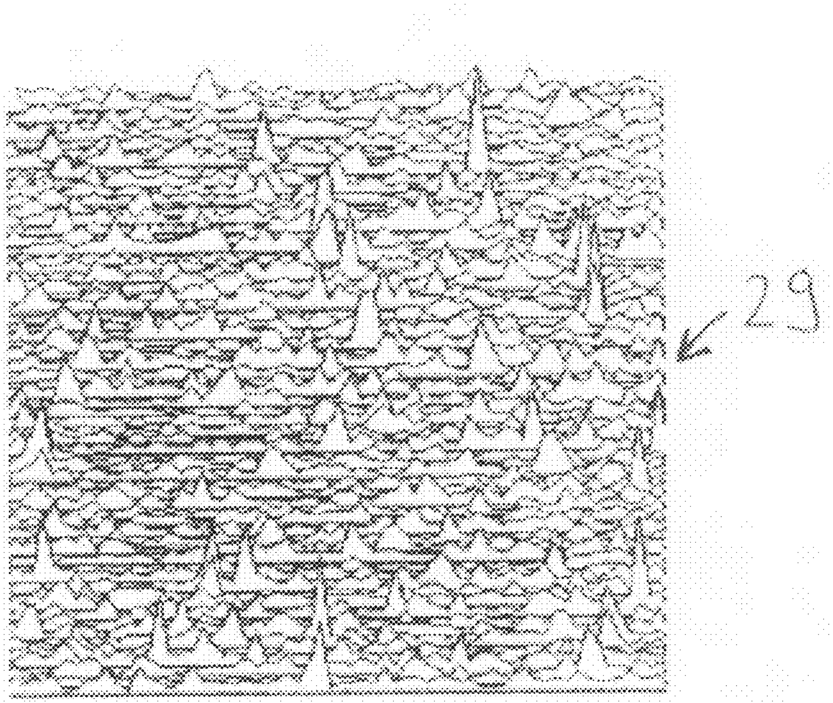
FIG. 6 is a gray scale value diagram of the full-tone measuring field or macroscopic photogram of FIG. 5.

In contrast, FIG. 6 is a gray scale value diagram 29 in the macroscopic photogram of a full-tone measuring field 22*a* according to FIG. 5, in which substantially larger deviations of the gray scale values are concluded over the image coordinates of the macroscopic photogram of the full-tone measuring field 22*a*. In this case, the uniformity distribution and the noise of the gray scale values are higher than the corresponding nominal value or limiting value in numerous pixels from which it can be determined that a full-tone measuring field 22*a* of inferior print quality is examined in this case.

It is therefore preferred to determine the uniformity distribution or the noise of the gray scale values relative to a nominal value or a limiting value based on the image coordinates of the full-tone measuring field 22*a* or the image coordinates of the macroscopic photogram of the full-tone measuring field in order to carry out a qualitative evaluation of the full-tone measuring field 22*a*. In addition, how frequently or at how many pixels the gray scale value exceeds the nominal value or limiting value of the uniformity distribution or the noise, respectively, is examined.

If substantial deviations from the nominal value or limiting value are detected at numerous pixels, it can be concluded that a full-tone measuring field of inferior print quality is examined. However, if only slight deviations from the nominal value or limiting value are detected at a relatively large number of pixels, it can be concluded that a full-tone measuring field of adequate print quality is examined.

Figure 7:
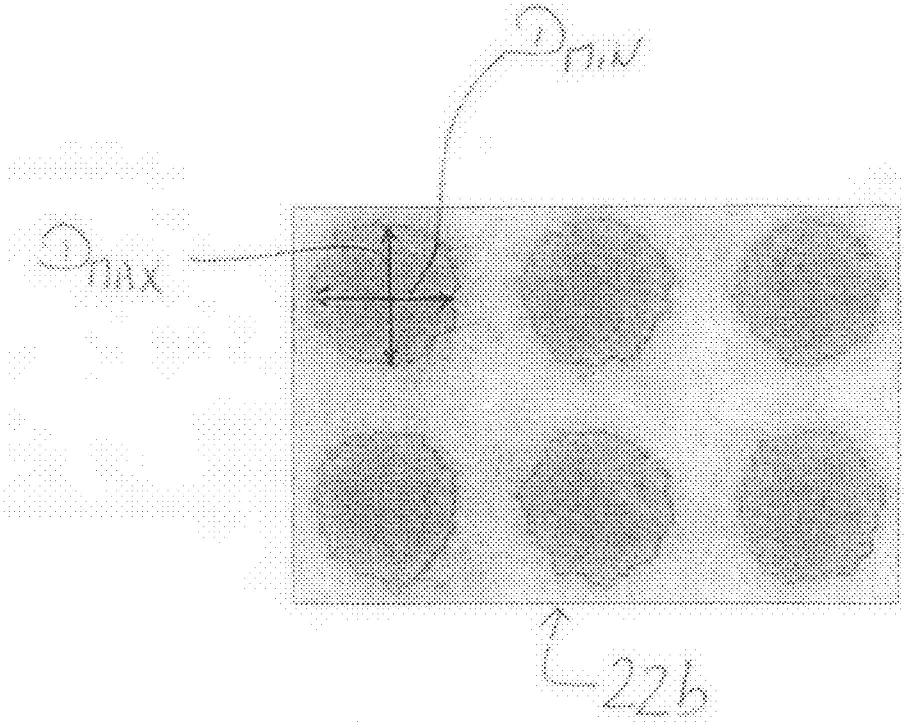
FIG. 7 is an exemplary macroscopic photogram of a halftone measuring field.

The method of the present invention is also suitable for examining halftone measuring fields. FIG. 7 is a macroscopic photogram of a halftone measuring field 22*b* in the region of six halftone dots. The halftone dots are in the form of round halftone dots in the illustrated embodiment. Any other shape of halftone dots may also be chosen in a halftone measuring field 22*b* instead of all round halftone dots. In order to evaluate the print quality of a halftone measuring field 22*b*, at least one macroscopic photogram of the halftone measuring field 22*b* is recorded, according to the invention, with the aid of a camera that features a macro lens. An actual value of at least one parameter relevant to the print quality is determined from each macroscopic photogram using an image processing method. With respect to the halftone measuring field 22*b*, each actual value consists of a geometric parameter of the halftone dots of the halftone measuring field 22*b*. It can be concluded that a halftone measuring field of adequate print quality is examined if each geometric parameter is lower than the corresponding nominal value or limiting value, and that a halftone measuring field 22*b* of inferior print quality is examined if each geometric parameter is higher than the corresponding nominal limiting value.

According to a first alternative embodiment of the present invention, the most frequent gray scale values are determined with the aid of a gray scale value diagram 30 of the halftone measuring field 22*b* using an image processing method so as to define a geometric parameter for round halftone dots of a halftone measuring field 22*b*. In this case, all image information that lies outside the most frequent gray scale values is filtered out of the macroscopic photogram.

Subsequently, a minimum halftone dot diameter $D_{MIN}$ and a maximum halftone dot diameter $D_{MAX}$ are determined for each halftone dot by utilizing the correspondingly filtered macroscopic photogram of the halftone measuring field 22*b*. A first halftone dot deformation value is determined for each halftone dot from the minimum halftone dot diameters $D_{MIN}$ and the maximum halftone dot diameters $D_{MAX}$ by utilizing the following formula:

$$RPDW_1 = \frac{D_{MAX} - D_{MIN}}{D_{MAX}} * 100\%$$

wherein $RPDW_1$ is the first halftone dot deformation value of a halftone dot, $D_{MAX}$ is the maximum halftone dot diameter of a halftone dot and $D_{MIN}$ is the minimum halftone dot diameter of a halftone dot.

Figure 8:
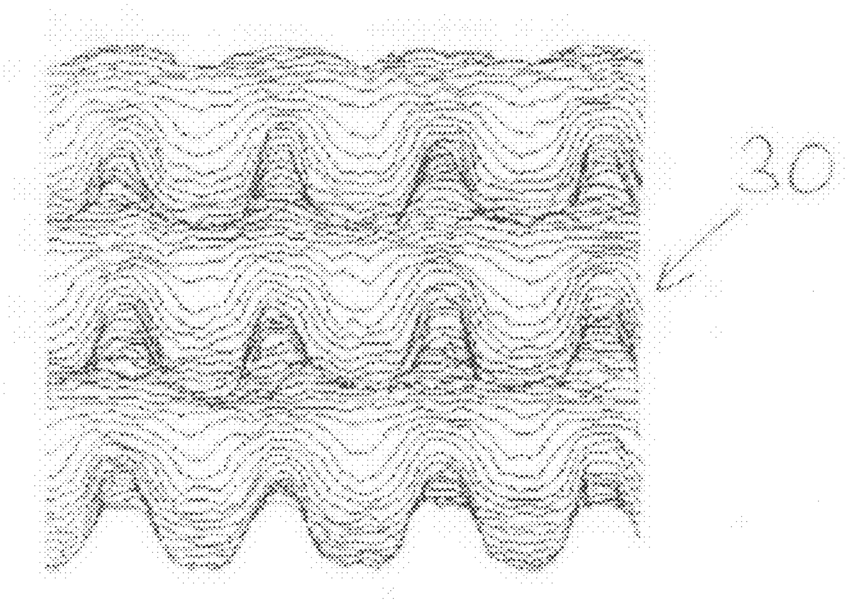
FIG. 8 is a gray scale value diagram of the halftone measuring field or macroscopic photogram of FIG. 7.

If the maximum halftone dot diameter $D_{MAX}$ and the minimum halftone dot diameter $D_{MIN}$ have approximately the same size and the halftone dot deformation value $RPDW_1$ of the halftone dots is consequently relatively small as shown in the example of the filtered macroscopic photogram of the halftone measuring field 22*b* in FIGS. 7 and 8, it can be concluded that the halftone dots of the halftone measuring field 22*b* are round and printed with adequate quality.

Figure 9:
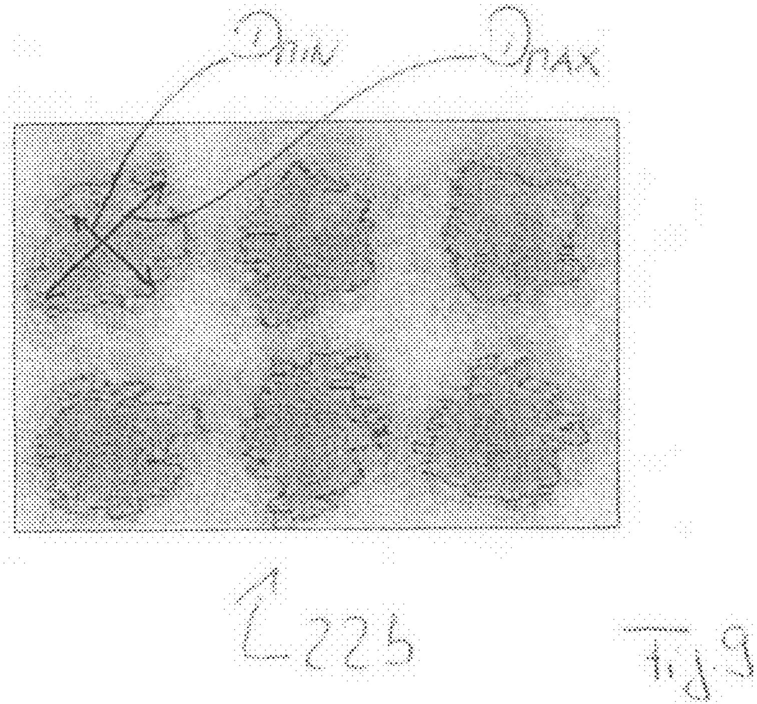
FIG. 9 is another exemplary macroscopic photogram of a halftone measuring field.
Figure 10:
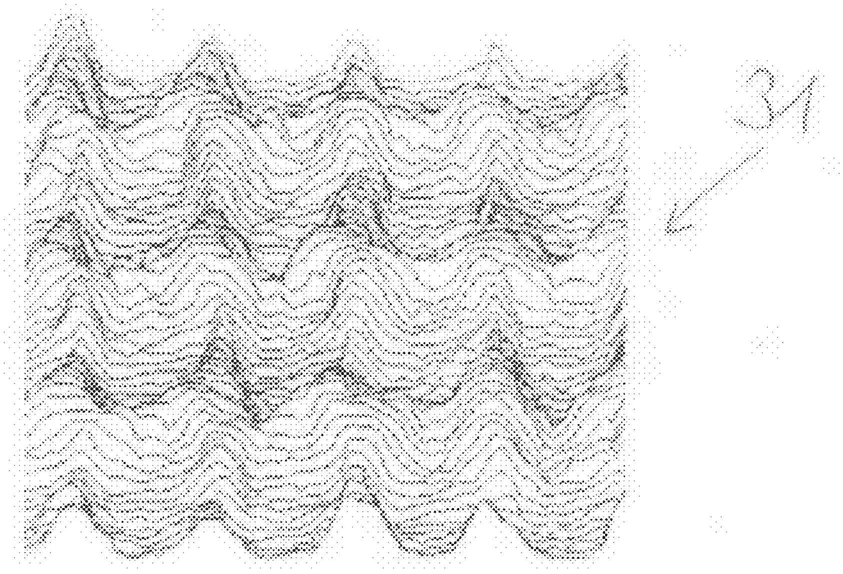
FIG. 10 is a gray scale value diagram of the halftone measuring field or macroscopic photogram of FIG. 9.

However, if the minimum halftone dot diameter $D_{MIN}$ and the maximum halftone dot diameter $D_{MAX}$ deviate significantly and the first halftone dot deformation value $RPDW_1$ is consequently relatively large as shown in the example of the filtered macroscopic photogram of the halftone measuring field 22*b* in FIGS. 9 and 10, it can be concluded that the halftone dots have an inferior print quality and that doubling of the halftone dots has occurred. This means that the print quality of the halftone dots increases proportionally to the decrease in the difference between the minimum and the maximum halftone dot diameter.

The difference between a halftone measuring field 22*b* of adequate print quality according to FIG. 7 and a halftone measuring field 22*b* of inferior print quality according to FIG. 9 can also be determined based on a comparison between the corresponding gray scale value diagrams 30 and 31 according to FIGS. 8 and 9, which again consist of inverted gray scale value diagrams. For example, the gray scale value diagram 30 according to FIG. 8 of a halftone measuring field 22*b* of adequate print quality is characterized by round and defined transitions between adjacent halftone dots. In contrast, the gray scale value diagram 31 of a halftone measuring field 22*b* of inferior print quality shows undefined and unround transitions.

According to further aspect of the present invention, another geometric parameter in the form of a second halftone dot deformation value can be determined for each round halftone dot of a halftone measuring field in addition to the above-mentioned first halftone dot deformation value, namely from a minimum surface of a halftone dot that is determined for a first defined gray scale value range and from a maximum surface of a halftone dot that is determined for a second defined gray scale value range. For this purpose, all pixels of the macroscopic photogram of the halftone measuring field that lie outside the first gray scale value range are filtered out with the aid of an image processing method after the first gray scale value range is defined. The minimum surface of the halftone dots of the halftone measuring field can then be calculated within this first gray scale value range. Subsequently, the gray scale value range is increased and the maximum surface of the halftone dots is determined within this gray scale value range. The second halftone dot deformation value is then calculated for each halftone dot from the minimum halftone dot surfaces and the maximum halftone dot surfaces by utilizing the following formula:

$$RPDW_2 = \frac{A_{MAX} - A_{MIN}}{A_{MIN}} * 100\%$$

wherein $RPDW_2$ is the second halftone dot deformation value of a halftone dot, $A_{MAX}$ is the maximum surface of a halftone dot and $A_{MIN}$ is the minimum surface of a halftone dot.

If the difference in surface between the minimum halftone dot surface and the maximum halftone dot surface is small and the second halftone dot deformation value consequently is comparatively small, it can be concluded that halftone dots of adequate print quality are examined and that the halftone dots have sharp flanks or edges. However, if the difference between the maximum halftone dot surface and the minimum halftone dot surface is relatively large, it can be concluded that bleeding of the halftone dots has occurred such that their edges or flanks are undefined.

The inventive method also makes it possible to detect smearing at the beginning of the printing process by analyzing the edges of a print control strip that was printed transverse to the transport direction of the material to be printed in the above-described fashion at the beginning of the printing process.

The inventive method for determining whether measuring fields of a printed product have an adequate print quality can be advantageously combined with a color control method in such a way that the actual values determined in the measuring fields with the aid of a densitometer and/or a colorimetric measuring device are only used for control purposes if it was determined beforehand that the measuring field has an adequate quality with the aid of the inventive method.

LIST OF REFERENCE SYMBOLS

20 Print control strip
21 Camera
22 Measuring field
22*a* Full-tone measuring field
22*b* Halftone measuring field
23 Double arrow
24 Step
25 Step
26 Step
27 Step
28 Gray scale value diagram
29 Gray scale value diagram
30 Gray scale value diagram
31 Gray scale value diagram

The invention claimed is:

1. A method for determining parameters relevant to the print quality of a printed product comprising the steps of:

recording a macroscopic photogram of a measuring field of the printed product using a camera having a macro lens;

determining an actual value of a parameter relevant to the print quality from the macroscopic photogram;

comparing the actual value to a nominal value of the parameter relevant to the print quality;

determining whether the measuring field is printed with adequate quality based on the comparison of the actual valve with the nominal value of the parameter relevant to the print quality;

said camera inspecting the measuring field in RGB-channels and recording one macroscopic photogram and a gray scale value diagram of the measuring field for each RGB-channel, said measuring field consisting of a halftone measuring field for a printing ink, the actual value for the halftone measuring field being determined in the form of a geometric parameter for the halftone measuring filed; and said geometric parameter being for a round halftone dot of the halftone measuring field, and said geometric parameter being determined in the form of a first halftone dot deformation value that is based on a minimum halftone dot diameter and a maximum halftone dot diameter of the halftone dot.

2. The method according to claim 1 wherein it is determined that a halftone measuring field is of adequate quality if the geometric parameter is lower than the nominal value.

3. The method according to claim 1 wherein it is determined that the halftone measuring field is of inferior quality if the geometric parameter is higher than the nominal value.

4. The method according to claim 1 wherein it is determined that doubling of the halftone dot has occurred if the first halftone dot deformation value is higher than the nominal value.

5. A method for determining parameters relevant to the print quality of a printed product comprising the steps of:

recording a macroscopic photogram of a measuring field of the printed product using a camera having a macro lens;

determining an actual value of a parameter relevant to the print quality from the macroscopic photogram;

comparing the actual value to a nominal value of the parameter relevant to the print quality;

determining whether the measuring field is printed with adequate quality based on the comparison of the actual valve with the nominal value of the parameter relevant to the print quality, said camera inspecting the measuring field in RGB-channels and recording one macroscopic photogram and a gray scale value diagram of the measuring field for each RGB-channel, wherein the measuring field consists of a halftone measuring field for a printing ink and the actual value for the halftone measuring field is determined in the form of a geometric parameter for the halftone measuring field, said geometric parameter being for a round halftone dot of the halftone measuring field and the geometric parameter being determined in the form of a second halftone dot deformation value that is based on a minimum halftone dot surface of the halftone dot and a maximum halftone dot surface of the halftone dot, wherein the minimum halftone dot surface is determined within a first defined gray scale value range and the maximum halftone dot surface is determined within a second defined gray scale value range.

6. The method according to claim 5 wherein it is determined that bleeding of the halftone dot has occurred if the second halftone dot deformation value is higher than the nominal value.

* * * * *